March 13, 1951     G. B. KIMES     2,545,364

CALCULATOR FOR DETERMINING FISH ACTIVITY PEAKS

Filed Oct. 28, 1949

INVENTOR.
GEORGE B. KIMES,
BY
ATTORNEY

Patented Mar. 13, 1951

2,545,364

UNITED STATES PATENT OFFICE 2,545,364

CALCULATOR FOR DETERMINING FISH ACTIVITY PEAKS

George B. Kimes, Tulsa, Okla.

Application October 28, 1949, Serial No. 124,207

6 Claims. (Cl. 235—88)

The present invention relates to a calculating device for use by fishermen to provide a convenient and rapid indication of the best hours of any day for fishing and the invention more specifically pertains to a disc carrying data thereon rotatable relative to a scale carried by a relatively small card so that the entire device is of such small size that it may be carried in a billfold or the like so as to be readily available for quick calculation and reference.

It is well established that certain hours of any given day provide the best period for fishing. Such data is available in book form. In the past, a fisherman has been required to examine a rather bulky and inconvenient publication involving a relatively great number of pages in order to determine the best time of any one day in a calendar year in order to determine the best hours for fishing.

An object of the present invention is to avoid the inconvenient form of such data and to provide a relatively simple arrangement of scales in a form resembling to some extent a circular slide rule for determining the best periods of the day for fishing and to thereby provide a device which may be conveniently carried so as to be readily available for use.

Another object of the invention is to so arrange the data in a fixed scale and to provide a cooperating movable indicating mechanism for fishermen which may be readily manufactured and assembled in large quantities at low cost and at the same time to provide a dial mechanism which is reliable in co-relating the factors which must be present to provide good fishing.

Other objects and features of the invention will be more apparent to those skilled in the art as the present disclosure proceeds and upon consideration of the accompanying drawing and the following detailed description wherein an exemplary embodiment of the invention for one particular calendar year is disclosed.

In the drawing:

Fig. 1 is a face view of the calculating device showing annular scale data on the relatively rotatable member and the scale on the stationary member.

Fig. 2 is a similar view with the movable member removed so as to more clearly indicate the data carried by the stationary member.

Fig. 3 is a sectional view taken on the line 3—3 of Fig. 1.

It has been found that a number of advantages are provided by being able to predict in advance the peak activity periods of the fish. Such information assists materially in the preliminary planning of a fishing trip, such as the timing of procurement of supplies and the departure to the stream or body of water where the fishing is to take place. After arrival at the lake or stream, the fisherman knowing the hours of peak activity of the fish can then schedule the fishing program along with other recreational or business activities. The fish dial calculator hereinafter disclosed in detail provides information for determining in advance the peak activity periods of the fish and when an individual is on an extended fishing trip of several days duration the fisherman may readily schedule his rest periods and meals as well as the periods to be spent on the water. In addition thereto, a commitment as to the probable time of returning home can be made more accurately when it is known in advance the end of an activity peak.

Referring to the drawing there is shown at 10 a relatively fixed member which may take any desired form and in the embodiment illustrated is substantially rectangular shaped cardboard member of a size comparable to that of identification cards and thereby adapted to fit into a bill-fold. The member 10 may be formed of any suitable material and while being flexible it should be sufficiently stiff to resist creasing or folding. The card is more clearly illustrated in Fig. 2 and carries data on one face thereof providing a fixed scale member.

A circular scale 12 is printed or otherwise affixed to the front face of the card 10 and this circular scale extends throughout three hundred and sixty degrees. The scale 12 is divided into 29.53 divisions with each of these divisions extending over 12.18 degrees. Each of these divisions represents a day of a calendar month. The day divisions are defined by radial lines 16 which are spaced from each other by 12.18 degrees. An index pointer 14 is arranged to extend radially inwardly from an inner circle 17 of the scale 12 and these index pointers are positioned approximately at the mid-point of each of the day divisions. The scale 12 also carries representations for the thirtieth and the thirty-first day of a month. The sector shaped boundary lines for the thirtieth day partly overlaps the division for the first day of the month and the sector-shaped boundary lines for the thirty-first day overlies a part of the first and second days of the month. A pointer 19 extends radially inward from the mid-point of the sector which represents the thirtieth day and an index line 21 extends radially inward from the representation of the thirty-first day.

The scale thus far described is based on the "Astronomical constant" known as the synodical length of the moon (from new moon to new moon) which averages twenty-nine days, twelve hours and forty-four minutes or 29.53 days. Thus when the angle of three hundred and sixty degrees is divided by the 29.53 days each day of the month is represented by a sector extending throughout 12.18 degrees. The scale 12 is accordingly a day scale and the card 10 carries the legend "Day of month" in association with the circular scale.

The fish dial includes a movable member carrying data thereon to indicate the primary peak periods of activity of the fish as well as the secondary peak periods of activity of the fish in any one day. It appears that fish are stimulated into activity four times daily. Two of these periods are known as primary peaks of activity and occur at that time of a twenty-four hour period when the moon is passing across the upper meridian (moon souths upper) and the other peak period of activity is at that time when the moon passes across the lower meridian (moon souths lower). These peak periods of activity occur approximately twelve hours apart. The other two periods are secondary periods of fish activity and occur approximately six hours before and six hours after a primary peak.

The movable member may be made in the form of a disc 26 carrying a circular scale 27 which is an "hour of day" scale. The disc 26 is mounted for rotation on the card 10 in any suitable manner, such as by means of a rivet 28 which extends through an opening in the disc 26 and an opening 29 in the card 10. The opening 29 is formed at the axis of the scale 12 and the opening in the disc 26 is formed concentric about the axis of the movable member. The scale 27 is divided into twenty-four divisions to represent the hours of a full day. This scale 27 is designed to indicate a "primary peak" and carries such a legend between an outer circle 31 and an inner circle 32 between which the hour scale 27 is arranged. One group of numerals in the scale 27 from one to twelve are circumferentially spaced from each other at distances slightly different from the second set of numerals extending from one to twelve and forming a part of the scale 27.

This unequal circumferential spacing of the numerals on the "hour of day" scale is due to the astronomical fact that the synodical length of the moon varies throughout the year from its average time of 29.53 days. It has been found that by spacing the numerals in the scale 27 in the manner as illustrated in Fig. 1 provides such a location of these numerals as to indicate a true average rather than dividing the scale into twenty-four equal arts which are spaced from each other by fifteen degrees. Another reason for the unequal spacing of the numerals in the scale 27 is that the moon in moving about the earth moves in an elliptical orbit rather than a true circle and the time from new moon to new moon varies from a minimum of twenty-eight plus days to a maximum of thirty plus days during a year. Thus the spacing of the numerals between the boundary lines 31 and 32 has been arrived at by so spacing the numerals as to correspond to the average time that the moon southed throughout the year for each day of the lunar or synodical month to thereby provide an accurate scale. It will be observed that the index points 14, 19 and 21 are so arranged as to be directed towards the numerals carried by the scale 27.

The movable member or rotatable disc 26 carries a second scale 36 for indicating the secondary peak period of fish activity. This scale is divided into twenty-four divisions consisting of one group of numerals from one to twelve and a second group of numerals from one to twelve. This scale is arranged between the circular line 32 and an inner circular line 37. In addition thereto, the rotatable disc 26 carries a third scale 41 which is divided into four sectors of substantially equal spacing and carries the legends "Best," "Good," "Fair" and "Poor." The orientation of these legends on the disc 26 is in accordance with the position of the moon in its orbit in relation to the earth. The best day of each month for fishing occurs on or about the time when the new moon occurs. Thus the radial line forming the left boundary of the sector "Best" in Fig. 1 is positioned in radial alignment with the date of the month on which the new moon occurs for that month. In the embodiment illustrated this end of the "Best" segment is in radial alignment with the twenty-fifth of July. The sector labeled "Poor" lies under that part of the month when the moon is in apogee (the point in the orbit of the moon at the greatest distance from the earth) when the poorest days for fishing occur. The other segments of the scale 41 correspond to those positions of the moon in its orbit which represent a change from the best fishing days to the poorest.

The card 10 is provided with data to designate a particular month of the year. The letters representing the months are carried by the card 10 within the upper half of the circular scale 12 and the arrangement of the letters or abbreviations for the months are more clearly shown in Fig. 2. The letter arrangements are radially disposed with respect to the opening 29 and are adapted for cooperation with an aperture or window 43 provided in the disc 26. This aperture is radially arranged and of such dimensions as to render the letters designating one of the months visible therethrough as shown in Fig. 1.

In operation of the device and assuming that it is desired to carry on some fishing during the month of July, the movable member or disc 26 is rotatable about its axis until the word "July" appears through the aperture or window 43, as shown in Fig. 1. If the date on which the fishing is planned is the nineteenth day of July, the index 14 opposite nineteen on the scale 12 will point to the hour of seven on the scale 27. An indication is thereby provided of seven o'clock in the morning and seven o'clock in the evening which represent the primary peak periods of fish activity for the date of July nineteenth. The primary peaks have a duration of about two hours. Thus these peaks extend from six to eight o'clock. The scale 36 in cooperation with the pointer 14 opposite the nineteenth day will also indicate that the secondary peak periods of activity will be at one p. m. and one a. m. each having a duration of approximately one hour. The scale 41 indicates that the fishing for this day of the month is not the best and is relatively poor. If the date of fishing is to take place on the seventh of July, the primary peak periods will be about nine-thirty in the morning and in the evening and the fishing will be good throughout the duration of these peak periods.

The scale arrangement herein disclosed in connection with the "hour of day" scales is for the calendar year of 1949 and since the data arrangement changes with the variations in the synodical period of the moon for each year minor changes in the spacing and orientation of the numerals in the scale 27 and in the scale 36 are necessary for each calendar year. The yearly change may also be accomplished by shifting the location and spacing of the month designations on the card 10 without changes in the scale 27 and the scale 36. Such changes may be made without departing from the spirit and scope of the invention and may be determined from time data included in "The American Ephemeris and Nautical Almanac." Such changes and others may be made without departing from the spirit and scope of the invention as set forth in the appended claims.

What I claim and desire to secure by Letters Patent is:

1. A device for determining a peak period of fish activity comprising, a card, a circular scale on said card having day of the month designations thereon circumferentially spaced from each other by 12.18 degrees, a disc rotatable relative to the card about an axis coincident with the center of said scale, a second circular scale on the disc having twenty-four numerals thereon representing hours, the numerals forming a part of the second scale being circumferentially spaced in accordance with the average time that the moon souths throughout a year period for each day of a synodical month, an index pointer carried by each designation on the first scale directed towards the second circular scale, a third scale carried by the disc having twenty-four numerals thereon representing hours with each numeral thereof circumferentially displaced from a corresponding numeral of the second scale by an angle occupied by six numerals, month designations carried by said card, and said disc having an aperture therein through which one month designation may be observed.

2. A device for determining a peak period of fish activity comprising, a card, a circular scale on said card having day of the month designations thereon circumferentially spaced from each other by 12.18 degrees, a disc rotatable relative to the card about an axis coincident with the center of said scale, a second circular scale on the disc having twenty-four numerals thereon representing hours, the numerals forming a part of the second scale being circumferentially spaced in accordance with the average time that the moon souths throughout a year period for each day of a synodical month, an index pointer carried by each designation on the first scale directed towards the second circular scale, month designations on said card, and said disc having an aperture therein for cooperation with the month designations.

3. A device for determining a peak period of fish activity comprising, a relatively stationary member, a circular scale on said member having day of the month designations thereon circumferentially spaced from each other by 12.18 degrees, a disc mounted on the stationary member for rotation about the center of said scale, a circular scale having twenty-four numerals on said disc representing hours, the numerals forming a part of the second scale being circumferentially spaced in accordance with the average time that the moon souths throughout a year period for each day of a synodical month, an index pointer carried by each designation of the first scale directed towards the second circular scale, letters providing month designations on the stationary member within the first circular scale with the letters arranged in radial positions relative to the center of the first scale, and said disc having a window therein of elongated shape radially of the disc through which the letters of the month designations may be selectively observed.

4. In a device for determining periods of fish activity, a relatively stationary member, a circular scale on said member having day of the month designations thereon circumferentially spaced from each other by 12.18 degrees, a disc mounted on the stationary member for rotation about the axis of said scale, an index pointer carried by each designation of said scale directed towards the periphery of the disc, letters providing month designations on the stationary member within the circular scale with said letters arranged in radial arrangements relative to the axis of said scale, said disc having an aperture therein of elongated shape radially of the disc through which the letters of the month designations may be selectively observed, and an arcuate scale carried by said disc carrying legends of relative fish activity oriented on the disc in accordance with the movement of the moon in its orbit in relation to the earth.

5. In a device for determining periods of fish activity, a relatively stationary member, a circular scale on said member having day of the month designations thereon circumferentially spaced from each other by 12.18 degrees, a disc mounted on the stationary member for rotation about the axis of said scale, an index pointer carried by each designation of said scale directed towards the periphery of the disc, letters providing month designations on the stationary member within the circular scale with said letters arranged in radial arrangements relative to the axis of said scale, said disc having an aperture therein of elongated shape radially of the disc through which the letters of the month designations may be selectively observed, an arcuate scale carried by said disc divided into four sectors of substantially equal circumferential dimensions and carrying legends "Best," "Good," "Fair," and "Poor" oriented on the disc in accordance with the movement of the moon in its orbit in relation to the earth.

6. In a device for determining periods of fish activity, a relatively stationary member, a circular scale on said member having day of the month designations thereon circumferentially spaced from each other by 12.18 degrees, a disc mounted on the stationary member for rotation about the axis of said scale, an index pointer carried by each designation of said scale directed towards the periphery of the disc, letters providing month designations on the stationary member within the circular scale with said letters arranged in radial arrangements relative to the axis of said scale, said disc having an aperture therein of elongated shape radially of the disc through which the letters of the month designations may be selectively observed, an arcuate scale carried by said disc divided into four sectors of substantially equal circumferential dimensions and carrying legends of relative fish activity oriented on the disc in accordance with the movement of the moon in its orbit in relation to the earth, and a second circular scale on said disc having twenty-four numerals thereon representing hours with the numerals circumferentially spaced in accordance with the average time that the moon souths throughout a year period for each day of a synodical month.

GEORGE B. KIMES.

REFERENCES CITED

The following references are of record in the file of this patent:

UNITED STATES PATENTS

| Number | Name | Date |
| --- | --- | --- |
| 1,414,855 | Bishop | May 2, 1922 |
| 2,496,942 | Hill | Feb. 7, 1950 |